US012337361B2

(12) United States Patent
Starostin et al.

(10) Patent No.: US 12,337,361 B2
(45) Date of Patent: Jun. 24, 2025

(54) METHOD FOR CLEANING EQUIPMENT WITH A HOLLOW SEALED CIRCUIT AND RINSING SOLUTION FOR ITS EMBODIMENT

(71) Applicant: ANGARA GLOBAL LTD, London (GB)

(72) Inventors: Gennady Sergeevich Starostin, Moscow (RU); Ilya Yurevich Rodin, Moscow (RU)

(73) Assignee: ANGARA GLOBAL LTD, London (GB)

( * ) Notice: Subject to any disclaimer, the term of this patent is extended or adjusted under 35 U.S.C. 154(b) by 0 days.

(21) Appl. No.: 18/263,968

(22) PCT Filed: Feb. 3, 2021

(86) PCT No.: PCT/IB2021/000107
§ 371 (c)(1),
(2) Date: Aug. 2, 2023

(87) PCT Pub. No.: WO2022/167830
PCT Pub. Date: Aug. 11, 2022

(65) Prior Publication Data

US 2024/0299994 A1 Sep. 12, 2024

(51) Int. Cl.
*B08B 9/032* (2006.01)

(52) U.S. Cl.
CPC .......... *B08B 9/0325* (2013.01); *B08B 9/0326* (2013.01); *B08B 9/0328* (2013.01); *B08B 2209/032* (2013.01)

(58) Field of Classification Search
CPC ............ B08B 2209/032; B08B 9/0325; B08B 9/0326; B08B 9/0328
See application file for complete search history.

(56) References Cited

U.S. PATENT DOCUMENTS

| | | | | |
|---|---|---|---|---|
| 6,454,871 | B1 | 9/2002 | Labib et al. | |
| 2014/0083462 | A1* | 3/2014 | Plavidal | B08B 3/10 134/34 |
| 2021/0028089 | A1* | 1/2021 | Guo | H01L 23/473 |

FOREIGN PATENT DOCUMENTS

| | | | |
|---|---|---|---|
| FR | 2824753 | A1 | 11/2002 |
| RU | 2211099 | C2 | 8/2003 |

(Continued)

OTHER PUBLICATIONS

International Search Report for PCT/IB2021/000107 mailed Oct. 27, 2021, 3 pages.

(Continued)

*Primary Examiner* — Douglas Lee
(74) *Attorney, Agent, or Firm* — Nixon & Vanderhye PC

(57) ABSTRACT

The invention relates to a method for cleaning equipment with a hollow sealed circuit and can be used in industry for cleaning equipment from salt measures, oil deposits, including asphalt paraffin, tar deposits and biological deposits. The claimed method of cleaning the inner surface of the equipment with a hollow sealed circuit consists in pumping a washing solution through an internal cavity of the said circuit with an unsteady flow regime created by local stops of the washing solution flow at the moment of oxygen or carbon dioxide gas formation, characterized by an intensity at which the pressure in the gas bubble moments of time, namely when the bubble grows, exceeds the pressure of the wash solution. The embodiment of the claimed method allows, while maintaining the cleaning efficiency, to significantly simplify its implementation and further expand the scope of use.

8 Claims, 1 Drawing Sheet

(56) References Cited

FOREIGN PATENT DOCUMENTS

| | | | | | |
|---|---|---|---|---|---|
| RU | 2552450 | C1 | | 6/2015 | |
| WO | WO-2019198368 | A1 | * | 10/2019 | ............. B08B 9/032 |

OTHER PUBLICATIONS

Written Opinion of the ISA for PCT/IB2021/000107 mailed Oct. 27, 2021, 5 pages.

* cited by examiner

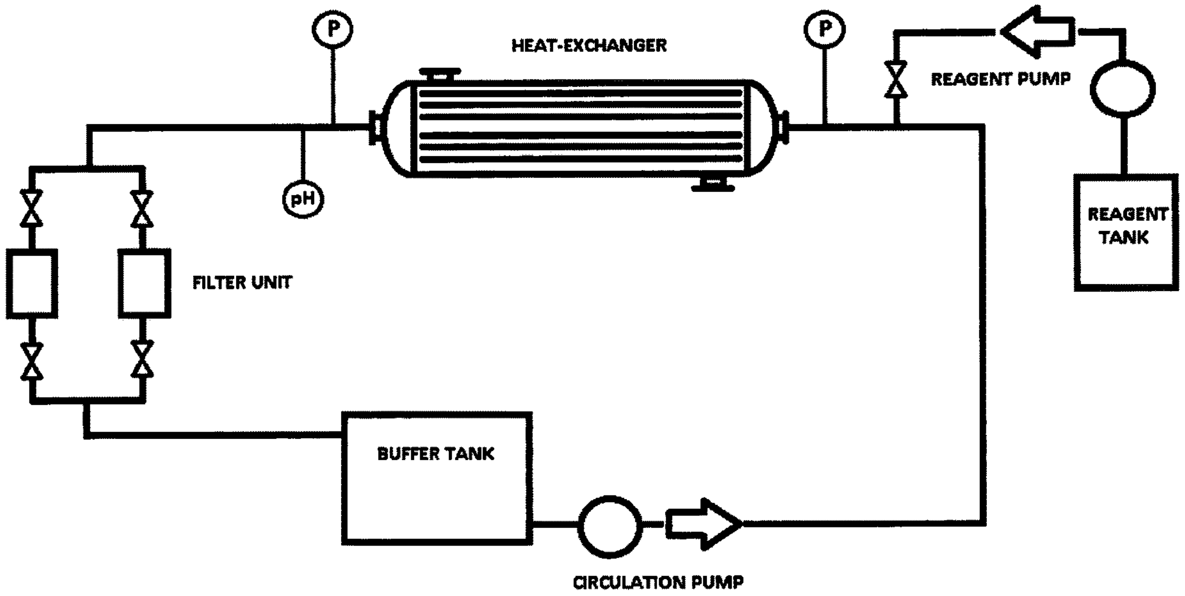
P
HEAT-EXCHANGER
P
REAGENT PUMP
pH
REAGENT TANK
FILTER UNIT
BUFFER TANK
CIRCULATION PUMP

METHOD FOR CLEANING EQUIPMENT WITH A HOLLOW SEALED CIRCUIT AND RINSING SOLUTION FOR ITS EMBODIMENT

CROSS-REFERENCE TO RELATED APPLICATION

This application is the U.S. national phase of International Application No. PCT/IB2021/000107 filed Feb. 3, 2021, which designated the U.S., the entire contents of which are hereby incorporated by reference.

FIELD OF THE INVENTION

The invention relates to a method for cleaning equipment with a hollow sealed circuit and can be used in industry for cleaning equipment from salt and oxide deposits, deposits of petroleum nature, including asphalt, resin and paraffin deposits and biological deposits.

BACKGROUND OF THE INVENTION

There is a known method for cleaning hollow products, which consists in pumping fluid with an unsteady flow regime through the cavity of the equipment. Wherein, an unsteady flow regime is created by periodically changing the fluid flow from zero to a value determined by the fluid pressure not exceeding the operating pressure for the product being cleaned, by alternately redistributing the fluid flow between the two products being cleaned. (RU 2552450, RIIT LLC, published on 10 Jun. 2015) The method is not convenient enough for embodiment, since for cleaning it is necessary to have two identical products to be cleaned, which causes certain technical problems when performing cleaning at industrial facilities.

There is a known method for cleaning hollow products, which consists in the fact that through the cavity of the product the fluid with a given flow rate and the creation of hydrodynamic effects by abrupt inhibition of flow is pumped. The hydrodynamic effect is created by entering an oncoming fluid flow greater than or equal to the primary flow rate into the product, and accelerating it in the cavity of the product in the opposite direction to the original value of the flow rate. The disadvantage of this method is the need to use a complex special device, which provides the process of entering the oncoming flow and cleaning. (RU 2211099, Omsk Research Institute of Engineering Technology, published on 27 Aug. 2003)

In addition, such methods are known for intensifying the cleaning process, as hydropercussion, gas-liquid, ultrasonic, hydro-cavitating, etc. (V. M. Sapozhnikov. Installation and testing of aircraft hydraulic and pneumatic systems.-M.: Engineering, 1979, p. 95-99). Their common disadvantage is the complexity of embodiment, the limited range of use, depending on the strength and geometric parameters of the product being cleaned and the composition, amount and nature of the internal cavities pollution.

SUMMARY OF THE INVENTION

The general object of the invention is to provide a method for cleaning equipment with a hollow circuit contaminated with deposits of organic, salt or oxide origin.

The general technical result of the invention is to simplify the embodiment of the method while maintaining the cleaning efficiency of the above equipment.

The object and the required technical result are achieved by creating an unsteady flow regime of the washing solution by dosing into the solution of chemicals that cause gas formation in the solution. A new method of cleaning the inner surface of the equipment with a hollow sealed circuit consists in pumping a washing solution through an internal cavity with an unsteady flow regime created by local stops of the washing solution flow at the moment of oxygen or carbon dioxide gas formation, characterized by an intensity at which the pressure in the gas bubble moments of time, namely when the bubble grows, exceeds the pressure of the wash solution.

According to one of the embodiments, the gas formation of oxygen occurs due to the metered addition of hydrogen peroxide to the washing solution in a concentration from 0.5 to 38% of the weight percent. The hydrogen peroxide solution is supplied in portions of 2 to 100 litres, depending on the volume of the internal flushed cavity of the equipment.

According to another embodiment of the invention, the formation of carbon dioxide occurs through the metered addition of at least one carbonic acid salt in solid form or in the form of a solution or suspension with a concentration from 1 to 20%, followed by the addition of an organic or inorganic acid or mixture of acids with a concentration from 1 to 40%. Wherein, sodium, potassium, ammonium or another alkali or alkaline earth metal carbonate or bicarbonate is used as a carbonic acid salt. As the inorganic acid, for example, hydrochloric acid, sulfuric acid, nitric acid, phosphoric acid are used. As the organic acid, for example, formic, oxalic, sulfamic, methanesulfonic acids are used.

According to the invention, for example, water, a solution or an emulsion of acids, alkalis, salts, organic solvents, complexonates, surfactants, or any combination thereof are used as a washing solution.

The object and the required technical result are also achieved by combining the unsteady fluid flow with the chemical action of a washing solution comprising components for dissolving deposits depending on their (deposits) chemical composition.

The essence of the claimed purification technology is the catalytic decomposition of hydrogen peroxide (according to the first embodiment) or the formation of carbon dioxide (according to the second embodiment) in the volume of the washing solution. The washing solution should be read as any liquid composition used for washing equipment with a hollow circuit, which, in the framework of this invention, is a medium for gas reactions. In the simplest case, it can be just water, but it can also be a solution or emulsion of acids, alkalis, salts, organic solvents, complexonates, surfactants, etc. The specific composition is determined based on the nature of the deposits and the type of structural material of the circuit. Heavy metal ions, iodide ions, finely dispersed manganese dioxide, including those obtained during the preparation of the washing solution, catalase, and other ions and compounds known for their catalytic effect, such as those specially introduced into the washing solution and formed in the washing solution during the dissolution of deposits can act as a catalyst for the decomposition of hydrogen peroxide. Gaseous oxygen released during the catalytic decomposition of hydrogen peroxide, or gaseous carbon dioxide released as a result of alternating dosing of two reagents (salts of carbonic acid and acid), form areas with an unsteady flow regime due to a sharp increase in the volume of gas inside the flushed circuit. A sharp increase in gas volume in a confined space leads to a local increase in pressure, which leads to an increase in the flow rate of the solution in the flow direction and the occurrence of a flow against the flow. Thus, in the solution flow, zones of zero movement of the solution spontaneously are created for small periods of time, which is equivalent to a short-term interruption of the flow. Due to the ongoing process of creating gas generation zones (decomposition of hydrogen peroxide or carbon dioxide evolution) and, as a result, creating short-term interruptions in the flow, the flow in a closed circuit does not have time to establish. Unsteady flow is the driving force for the separation of deposits from the surface of the equipment. The fluid flow characterised as unsteady if its fluid dynamics values change over time within the whole volume occupied by fluid or any of its parts. The supply of concentrated hydrogen peroxide or a carbonic acid salt in portions is embodied at the beginning of the circuit. As a result, zones of increased concentration of these reagents in the wash solution are formed. Initially, these zones are not sources of the formation of an unsteady flow, since the rate of oxygen or carbon dioxide release is correspondingly insufficient to achieve pressure in the gas bubbles, which could stop the moving flow. As the reaction proceeds, the temperature inside the zone of increased concentration increases, and the rate of gas formation increases, which leads to a sharp increase in the volume and pressure of the gas and, as a consequence, a temporary stop of the flow. The rate of gas volume increase depends on the pressure of the washing solution and the rate of gas formation reaction, which in turn depends on temperature. In this regard, a local stop of the washing solution flow occurs at a time when the pressure in the gas bubble exceeds the pressure of the washing solution.

BRIEF DESCRIPTION OF THE DRAWINGS

On FIG. 1 is a drawing of the Alpha Contour installation according to Example 1. The installation connected to the heat exchanger consists of a buffer tank, an electric pump unit, a filtering module, and a reagent supply pump connected by flexible hoses. Pressure gauges are installed in the inlet and outlet pipelines to measure the pressure drop in the flushed heat exchanger.

DETAILED DESCRIPTION OF THE INVENTION

As discussed above, the essence of the claimed technology is to create an unsteady fluid flow by initiating a gas formation reaction in the washing solution by dosing chemical reagents into it.

In the first alteration, hydrogen peroxide is used as a dosed reagent in a concentration of 0.5 to 38% weight percent, depending on the type of equipment and its degree of contamination. Hydrogen peroxide is supplied in portions of 2-100 litres, depending on the volume of equipment, in the flushed circuit, which ensures gas formation in the solution due to the catalytic decomposition reaction.

The concentration range of hydrogen peroxide, which is established as a result of dosing in the washing solution, is 0.5-15%. A concentration of hydrogen peroxide below 0.5% does not seem to be effective enough to remove deposits; at concentrations above 15%, the risk of excessively violent decomposition of hydrogen peroxide with the ejection of the washing solution from the circuit and the risk of deformation or destruction of the washed equipment increases significantly. The maximum concentration of hydrogen peroxide created in the washing solution depends on the degree of the equipment contamination, possible values of operating pressures and also on the material of the equipment. The concentration range of hydrogen peroxide, which is dosed into the washing solution as a reagent that causes the reaction of gas formation, is 0.5-38%. At the same time, dosing a solution of hydrogen peroxide with a concentration below 0.5% is not effective, and the use of hydrogen peroxide with concentrations above 38% is not recommended for safety reasons.

This method has the advantage that only one reagent is required for the embodiment. The disadvantage of the first alteration is the corrosive effect of the washing solution on metal surfaces, in the case of strong acids in the composition of the washing solution.

In the second embodiment, two reagents are used, dosed alternately. The first reagent is a salt or a mixture of salts of carbonic acid (sodium carbonate, sodium hydrogen carbonate, potassium carbonate, ammonium carbonate, ammonium hydrogen carbonate, calcium carbonate, magnesium carbonate) dosed in solid form or in the form of a solution/suspension with a concentration of from 1 to 20%. Wherein, the concentration of the carbonic acid salt in the washing solution is set in the range from 1 to 10%. After filing and saturating the washing solution with a carbonic acid salt, a second reagent is supplied-hydrochloric or other acid or a mixture of acids displacing carbon dioxide from sodium carbonate (including sulfuric, phosphoric, nitric, acetic, oxalic, formic, sulfamic, methanesulfonic, etc.) with a concentration of from 1 to 40%. As a result of the reaction, carbon dioxide is formed, the release of which provides an unsteady fluid flow. The supply of acid is embodied to achieve a predetermined pH level of the washing solution, which can lie in the range from 1 to 9 pH units. The advantages of this method include the inertness of the formed carbon monoxide.

To substantiate the quantitative content of the reagents, as well as to compare the two solutions for cleaning deposits of metal surfaces of the equipment, samples of dosed solutions were prepared (see. Table. 1) that have been tested to evaluate the effectiveness of cleaning. Wherein, a 0.5% solution of nonionic surfactant (in the case of introducing hydrogen peroxide further comprising 0.05% potassium iodide) was used as a washing solution, fragments of tubes (diameter 38 mm, length 90 cm) from a real shell-and-tube were used as washing circuits heat exchanger contaminated with asphalt-resin-paraffin deposits. Using flexible hoses, the ducts were connected to circulation and metering pumps and a 20 litre buffer tank. The cleaning efficiency was evaluated by changing the mass of the duct before and after cleaning with respect to the total mass of deposits in the tube.

TABLE 1

| | The number of the dosed solution and the content of components in it | | | | | | | | | | | | | | |
|---|---|---|---|---|---|---|---|---|---|---|---|---|---|---|---|
| Component | 1 | 2 | 3 | 4 | 5 | 6 | 7 | 8 | 9 | 10 | 11 | 12 | 13 | 14 | 15 |
| $H_2O_2$ | 0.5 | 1 | 5 | 10 | 20 | 38 | | | | | | | | | |
| $Na_2CO_3$ | | | | | | | 5 | 5 | 10 | 10 | 10 | 10 | 10 | 10 | 20 |

TABLE 1-continued

| | The number of the dosed solution and the content of components in it | | | | | | | | | | | | | | |
|---|---|---|---|---|---|---|---|---|---|---|---|---|---|---|---|
| Component | 1 | 2 | 3 | 4 | 5 | 6 | 7 | 8 | 9 | 10 | 11 | 12 | 13 | 14 | 15 |
| HCl | | | | | | | 5 | 10 | 1 | 5 | 10 | 37 | | | 5 |
| HCOOH | | | | | | | | | | | | | 5 | 40 | |

The above solutions were obtained by dissolving or diluting the concentrated components to the concentration indicated in table 1.

The resulting solutions were dosed into the wash circuit as follows: hydrogen peroxide was introduced in one portion, and in the case of using two reagents, first a solution containing sodium carbonate was fed, then after 5 minutes an acid solution was fed. Each reagent was supplied once, after which the washing solution was circulated for 15 minutes. After that, the cleaning efficiency was evaluated. The results are shown in table No. 2.

TABLE 2

| Solution number | Wash solution without reagents | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Cleaning efficiency | 2 | 4 | 15 | 35 | 65 | 95 | 100 | 40 | 60 | 10 | 65 | 95 | 100 | 50 | 90 | 70 |

In the case of hydrogen peroxide, an increase in the purification efficiency is associated with an increase in the rate of gas formation and the temperature of the washing solution, which results in the use of the most concentrated initial solutions (1-6).

The same results are shown using sodium carbonate and carbonic/formic acids (7-15).

The following are examples of specific implementation of the method.

Example No. 1 of a specific implementation of the method. The method is implemented when cleaning the Alfa Laval Compabloc CP75 plate heat exchanger from asphalt-paraffin deposits formed during heating of crude oil (cold side) with stillage residue of atmospheric distillation (hot side). The heat exchanger is made of AISI 316L stainless steel, has installation dimensions of 1240×1240× 3600 mm, plate size 1200×1200 mm, working pressure of the circuits up to 32 bar, the volume of each circuit is 2.24 $m^3$. AlfaContour was used as equipment for the circulation of the washing solution (see drawing), consisting of an electric pump unit with a capacity of 100 $m^3$/h, maximum pressure of 0.32 MPa, a buffer tank with a volume of 0.8 $m^3$, a filter module and a pump for supplying a reagent that, when introduced into the washing solution, causes a gas formation reaction. 4% alkaline solution of anionic and nonionic surfactants comprising 10% ethyl cellosolve was used as a washing solution, and hydrogen peroxide was used as a reagent that causes a gas formation reaction. Hydrogen peroxide was introduced into the flow of the washing solution immediately in front of the heat exchanger in 3 portions of 60 litres each (based on a 2% concentration of hydrogen peroxide in the washing solution). The completeness of the decomposition of hydrogen peroxide was evaluated visually by the release of oxygen bubbles in the buffer tank. The temperature of the washing solution in the buffer tank during cleaning did not exceed 30° C. The quality of cleaning was assessed by the change in the pressure drop between the inlet and outlet of the heat exchanger, while the specified pressure drop was compared with the nameplate value for the new heat exchanger (at a nominal flow rate of 100 $m^3$/hour through the circuit.) It was established that the total cleaning time for each heat exchanger circuit was 9 hours (in this case, after the introduction of the 3rd portion of hydrogen peroxide, no significant change in pressure drop was observed, which indicates the sufficiency of introducing 2 portions of hydrogen peroxide and the actual cleaning time –6 hours). An AlfaContour installation drawing is shown in FIG. 2.

Example No. 2 of a specific implementation of the method. The method is implemented when cleaning the tube space of a shell-and-tube heat exchanger 1600 TKV-0.6-VT1-0/38G-4-2-U from mineral deposits of calcium sulfate. The heat exchanger is made of titanium, the length of the tube bundle is 4000 mm, the bore diameter is 38 mm. The volume of the pipe circuit is 4 $m^3$. For cleaning, an installation similar to Example No. 1 was used, further equipped with a pH meter in the outlet pipe. To heat the washing solution, steam was supplied into the annular space of the heat exchanger. A 5% aqueous solution of disodium salt of ethylenediaminetetraacetic acid was used as a washing solution, sodium bicarbonate and inhibited hydrochloric acid of 10% concentration were used as reagents causing the gas formation reaction. Sodium bicarbonate was entered in solid form into a buffer tank until pH=10 was reached in the washing solution leaving the heat exchanger. Hydrochloric acid was introduced into the heat exchanger by a pump for feeding the reagent. Hydrochloric acid was introduced into the flow of the washing solution immediately in front of the heat exchanger in portions of 20 l with increasing intervals from 5 to 15 minutes, until pH=4 was reached. The quality of cleaning during the process was assessed by the change in the free volume of the pipe circuit (by the level of fluid in the buffer tank) and, upon completion of the process, using visual and endoscopic examination of the tube bundle. The temperature of the washing solution in the buffer tank during the cleaning was maintained in the range of 35-40° C. It was established that the total cleaning time of the heat exchanger (until the level of the washing solution in the buffer tank stopped decreasing) was 6 hours, subsequent visual and endoscopic examination of the tube nest showed 100% removal of all deposits.

The embodiment of the claimed method allows, while maintaining the cleaning efficiency, to significantly simplify its implementation and further expand the scope of use.

Although this invention has been described in detail with examples of alterations that appear to be preferred, it must be remembered that these examples of the reduction to practice are provided only to illustrate the invention. This description should not be construed as limiting the scope of the invention, since the described cleaning method by specialists in the field of chemistry and others may be amended in order to adapt them to specific solution formulations or situations, and not beyond the scope of the appended claims. Person skilled in the art it is clear that within the scope of the invention, which is defined by the claims, various alterations and modifications are possible, including equivalent solutions.

The invention claimed is:

1. A method of cleaning the inner surface of equipment with a hollow sealed circuit by pumping through the inner cavity of the said circuit a washing solution with an unsteady flow regime created by local stops of the washing solution flow at the moment of oxygen or carbon dioxide gas generation, characterized by an intensity at which the pressure in the gas bubble during growth exceeds the pressure of the washing solution.

2. The method according to claim 1, wherein the oxygen gas generation occurs due to a metered addition of hydrogen peroxide to the washing solution in a concentration of from 0.5 to 38% weight percent.

3. The method according to claim 1, wherein a solution of hydrogen peroxide is added in portions of 2-100 litres, depending on the volume of the internal flushed cavity of the equipment.

4. The method according to claim 1, wherein the carbon dioxide gas generation occurs due to a metered addition of at least one salt of carbonic acid in a solid form or in the form of a solution or suspension with a concentration from 1 to 20%, followed by an addition of organic or inorganic acids or mixtures of acids with a concentration from 1 to 40%.

5. The method according to claim 4, wherein sodium carbonate, potassium, ammonium, or another alkali or alkaline earth metal is used as the carbonic acid salt.

6. The method of claim 4, wherein the inorganic acid includes at least one of hydrochloric acid, sulfuric acid, nitric acid, or phosphoric acid.

7. The method of claim 4, wherein the organic acid includes at least one of formic, oxalic, sulfamic, or methanesulfonic acid.

8. The method according to claim 1, wherein water, a solution or an emulsion of acids, alkalis, salts, organic solvents, complexonates, surfactants, or any combination thereof, are used as a washing solution.

* * * * *